United States Patent
Waag et al.

(10) Patent No.: US 11,789,250 B2
(45) Date of Patent: Oct. 17, 2023

(54) OPTICAL DETECTION DEVICE AND METHOD FOR OPERATING AN OPTICAL DETECTION DEVICE

(71) Applicant: Technische Universität Braunschweig, Braunschweig (DE)

(72) Inventors: Andreas Waag, Würzburg (DE); Daria Bezshlyakh, Braunschweig (DE); Hendrik Spende, Braunschweig (DE); Jan Gülink, Braunschweig (DE)

(73) Assignee: TECHNISCHE UNIVERSITÄT BRAUNSCHWEIG, Braunschweig (DE)

( * ) Notice: Subject to any disclaimer, the term of this patent is extended or adjusted under 35 U.S.C. 154(b) by 17 days.

(21) Appl. No.: 17/087,754

(22) Filed: Nov. 3, 2020

(65) Prior Publication Data
US 2021/0132357 A1 May 6, 2021

(30) Foreign Application Priority Data
Nov. 6, 2019 (GB) .................. 10 2019 129 932.2

(51) Int. Cl.
*G01N 21/64* (2006.01)
*G02B 21/36* (2006.01)
(Continued)

(52) U.S. Cl.
CPC ....... *G02B 21/365* (2013.01); *G01N 21/6458* (2013.01); *G02B 21/16* (2013.01); *G02B 27/30* (2013.01); *G01N 2021/6463* (2013.01)

(58) Field of Classification Search
CPC ...... G02B 21/365; G02B 21/16; G02B 27/30; G02B 21/086; G02B 21/364; G02B 21/0008; G01N 21/6458; G01N 2021/6463
See application file for complete search history.

(56) References Cited

U.S. PATENT DOCUMENTS 6,750,963 B2 * 6/2004 Sampas .............. G01N 21/6452
356/417
7,705,309 B1 * 4/2010 Jin ............................ G01J 5/08
250/370.08
(Continued)

FOREIGN PATENT DOCUMENTS

EP 3 320 567 B1 5/2019

*Primary Examiner* — David P Porta
*Assistant Examiner* — Djura Malevic
(74) *Attorney, Agent, or Firm* — WC&F IP

(57) ABSTRACT

An optical detection device having a light detection device and a light emission device is arranged such that the light detection side of the light detection device is optically coupled to a light emission side of a light source array of the light emission device via an examination region. The light detection device generates an electrical signal n response to light that reaches the light detection side. The light source array includes a plurality of separately actuatable electric light sources which are arranged in a matrix structure or two dimensional geometric arrangement. The object to be examined can be arranged in a desired fashion, and the light emitted by the light sources radiates via the examination region on the light detection side of the light detection device. An optical reduction is system is arranged in the beam path from the light emission side to the examination region and is configured to demagnify the light pattern which is emitted by the light sources. Thus, the examination region is irradiated by a light pattern that has been demagnified with respect to the light pattern emitted.

15 Claims, 2 Drawing Sheets

(51) Int. Cl.
*G02B 21/16* (2006.01)
*G02B 27/30* (2006.01)

(56) References Cited

U.S. PATENT DOCUMENTS

| | | | | |
|---|---|---|---|---|
| 8,581,213 B2* | 11/2013 | Kimura | ............... | G01N 21/6428 250/459.1 |
| 8,624,968 B1* | 1/2014 | Hersee | ................... | B82Y 15/00 382/128 |
| 8,643,947 B2* | 2/2014 | Nezu | ................... | G02B 21/0044 359/368 |
| 8,658,989 B2* | 2/2014 | Ikami | ................. | G01N 21/6428 250/459.1 |
| 8,705,172 B2* | 4/2014 | Kleppe | .............. | G02B 21/0036 359/385 |
| 8,866,063 B2* | 10/2014 | Ozcan | ................... | G02B 21/002 250/234 |
| 8,922,887 B2* | 12/2014 | Cooper | .............. | G02B 21/0032 359/368 |
| 9,063,074 B2* | 6/2015 | Paul | ........................ | G01N 21/31 |
| 9,103,932 B2* | 8/2015 | Tornkvist | ........... | G01N 21/6408 |
| 9,250,185 B2* | 2/2016 | Sirat | ........................ | G02B 21/16 |
| 9,429,521 B2* | 8/2016 | Kramer | ............... | G01N 33/025 |
| 9,547,177 B2* | 1/2017 | Kiontke | .................. | G02B 7/021 |
| 9,835,839 B2* | 12/2017 | Hein | ................... | G02B 21/086 |
| 10,201,054 B2* | 2/2019 | Waag | .................... | H05B 45/12 |
| 10,352,860 B2* | 7/2019 | Kanarowski | ......... | G02B 21/008 |
| 10,365,218 B2* | 7/2019 | Santori | ................... | G01J 3/433 |
| 10,458,931 B1* | 10/2019 | Richardson | ............ | G01N 23/22 |
| 10,509,215 B2* | 12/2019 | Shimada | ............. | G01N 21/6458 |
| 10,732,113 B2* | 8/2020 | Stubbe | ............... | G02B 21/0036 |
| 10,750,152 B2* | 8/2020 | Babayoff | ................ | G01J 3/50 |
| 10,754,140 B2* | 8/2020 | Chan | .................... | H04N 5/2256 |
| 11,041,806 B2* | 6/2021 | Blatz | ................... | G01N 21/6408 |
| 11,307,398 B2* | 4/2022 | Haase | .................. | G02B 21/367 |
| 2004/0157354 A1* | 8/2004 | Kuriyama | ............ | H01L 31/105 438/45 |
| 2006/0012872 A1* | 1/2006 | Hayashi | ............. | G02B 21/0076 359/371 |
| 2006/0244907 A1* | 11/2006 | Simmons | ................ | G02C 7/16 351/159.26 |
| 2007/0040095 A1* | 2/2007 | Walt | ........................ | G01J 3/10 250/216 |
| 2007/0057211 A1* | 3/2007 | Bahlman | ............ | G01N 21/6452 250/584 |
| 2007/0147204 A1* | 6/2007 | Nagamura | ............. | G11B 19/28 369/47.38 |
| 2007/0263226 A1* | 11/2007 | Kurtz | .................... | G01N 21/21 356/492 |
| 2008/0247298 A1* | 10/2008 | Ogata | ................. | G11B 7/1369 |
| 2009/0262324 A1* | 10/2009 | Patra | ................. | G03F 7/7085 355/68 |
| 2009/0309049 A1* | 12/2009 | Van Dijk | ............. | G01J 3/10 250/236 |
| 2011/0090553 A1* | 4/2011 | Kei | .................... | G02B 21/0076 359/235 |
| 2011/0263455 A1* | 10/2011 | Fawcett | ................. | G02B 5/045 506/12 |
| 2011/0299095 A1* | 12/2011 | Morgan | ............... | G01B 11/245 356/614 |
| 2012/0081535 A1* | 4/2012 | Hayashi | .............. | G02B 21/0032 348/79 |
| 2012/0223260 A1* | 9/2012 | Hansen | .................. | G01N 21/76 250/576 |
| 2012/0281258 A1* | 11/2012 | Sheblee | .............. | G02B 21/0072 358/474 |
| 2013/0010098 A1* | 1/2013 | Kalkbrenner | ....... | G01N 21/6458 348/79 |
| 2013/0128346 A1* | 5/2013 | Sanguu | .............. | G02B 21/0056 359/385 |
| 2013/0235255 A1* | 9/2013 | Westphal | ............... | G01N 21/25 348/360 |
| 2014/0104681 A1* | 4/2014 | Berman | ............. | G02B 21/0032 359/385 |
| 2014/0152801 A1* | 6/2014 | Fine | ........................ | H04N 7/18 348/79 |
| 2014/0192406 A1* | 7/2014 | Bathe | .................... | G02B 21/004 359/385 |
| 2015/0029583 A1* | 1/2015 | Hein | .................... | G02B 21/086 359/390 |
| 2015/0085289 A1* | 3/2015 | Kang | .................. | G02B 21/0032 356/445 |
| 2015/0131148 A1* | 5/2015 | Redford | ............ | G02B 21/0032 359/389 |
| 2015/0168702 A1* | 6/2015 | Harris | .................. | G02B 21/367 250/306 |
| 2015/0177503 A1* | 6/2015 | Sangu | .................. | G02B 21/361 359/363 |
| 2015/0234178 A1* | 8/2015 | Azuma | ............... | G02B 21/0044 359/201.2 |
| 2016/0084761 A1* | 3/2016 | Rothberg | ............. | C12Q 1/6869 506/4 |
| 2016/0161728 A1* | 6/2016 | Sangu | .................... | G02B 27/58 359/203.1 |
| 2016/0161751 A1* | 6/2016 | Kiontke | ................. | G02B 7/021 359/641 |
| 2016/0161856 A1* | 6/2016 | Johnson | .................. | G03F 7/704 355/55 |
| 2016/0238827 A1* | 8/2016 | Shroff | ................ | G02B 21/0036 |
| 2017/0023477 A1* | 1/2017 | Duer | ................ | G01N 33/54373 |
| 2017/0276608 A1* | 9/2017 | Kanarowski | ........ | G02B 21/0032 |
| 2017/0322403 A1* | 11/2017 | Shroff | ................ | G02B 21/0032 |
| 2017/0350983 A1* | 12/2017 | Hall | ...................... | G01S 17/10 |
| 2018/0003962 A1* | 1/2018 | Urey | .................. | G02B 27/0093 |
| 2018/0173000 A1* | 6/2018 | Rothberg | ........... | G02B 27/0944 |
| 2018/0199409 A1* | 7/2018 | Waag | ..................... | H01L 33/08 |
| 2019/0269333 A1* | 9/2019 | Bodenschatz | ........ | G02B 21/361 |
| 2019/0324240 A1* | 10/2019 | Shroff | ................. | G02B 21/0048 |
| 2019/0324253 A1* | 10/2019 | Zapata | .................... | G06V 10/22 |
| 2019/0346368 A1* | 11/2019 | Blatz | ................... | G01N 21/6486 |
| 2021/0132357 A1* | 5/2021 | Waag | .................... | G02B 21/16 |
| 2022/0026695 A1* | 1/2022 | Mahecic | .............. | G02B 21/0032 |

\* cited by examiner

OPTICAL DETECTION DEVICE AND METHOD FOR OPERATING AN OPTICAL DETECTION DEVICE

FIELD OF THE INVENTION

The invention relates to an optical detection device, comprising the following features:
a) a light detection device configured to generate an electrical signal in response to light that reaches a light detection side of the light detection device,
b) a light emission device having a light source array which comprises a multiplicity of separately electrically actuatable electric light sources, which are arranged in a manner distributed over the light source array in a matrix structure or in a two-dimensional geometric arrangement defined in any other way,
c) wherein the light detection side of the light detection device is optically coupled to a light emission side of the light source array via an examination region, in which an object to be examined by means of the optical detection device is arrangeable, and so the light emitted by the light sources radiates via the examination region on the light detection side of the light detection device.

BACKGROUND

Moreover, the invention relates to a method for operating such an optical detection device. Objects, for example a sample, arranged in the examination region of the optical detection device can be examined optically using such optical detection devices. A high resolution can be obtained during the optical examination by way of a light source array with a large number of separately electrically actuatable electric light sources. A generic optical detection device is known from EP 3 320 567 B1.

SUMMARY

The invention is based on the object of further improving the examination options of such an optical detection device.

In an optical detection device of the type set forth at the outset, this is achieved by virtue of an optical reduction system being arranged in the beam path from the light emission side of the light source array to the examination region, said optical reduction system being configured to optically demagnify a light pattern emitted by the light sources of the light source array such that the examination region is irradiated by a light pattern that has been demagnified in relation to the light pattern emitted by the light source array. An advantage of the invention is that the optical resolution can be significantly increased. In particular, this allows optical examinations to be carried out beyond the diffraction limit.

The optical reduction system can be provided with relatively small dimensions and in cost-effective fashion from cost-effective optical elements. The optical reduction system and the remaining optical elements require no particular interventions by the user, in particular no separate alignment during operation.

By way of example, the optical detection device according to the invention facilitates a nanometer resolution of structures of the object to be examined. In the process, normal light perceivable by humans can be used. In an advantageous embodiment of the invention, the optical detection device according to the invention can be operated using light at a single wavelength, in contrast to white light.

This is advantageous in that, for example, the diameter of the diffraction limit can be reduced by the application of short wavelength light since spectral components with longer wavelengths can be avoided in the case of light at one wavelength.

In contrast to microscopes based on a controllable laser light source, the optical detection device according to the invention allows a substantially simpler and more cost-effective structure to be obtained. Moreover, the entire optical detection device can be realized on much smaller scales. Moreover, the use of the light emission device according to the invention with a light source array allows a simplified generation of light patterns, alternating light patterns, in particular, being generated at high frequency only on the basis of high-speed software control. By way of example, the switching frequencies for driving the light sources can lie in the megahertz range. Such a light emission device can also be referred to as a segmented light emission device.

By way of example, the optical detection device can be embodied in such a way that the light detection device is arranged on one side of the examination region and the light emission device is arranged on the opposite, other side of the examination region such that light reaches the light detection side from the light emission side along a straight-lined beam path. The arrangement between the light detection device and the light emission device can also be designed differently, for example by virtue of elements that deflect light in part or in full, such as mirrors, semi-transparent mirrors, dichroic beam splitters, and similar elements, being arranged in the beam path of the light.

According to an advantageous embodiment of the invention, provision is made for the optical reduction system to comprise at least one collimation element, which is arranged on the side of the optical reduction system assigned to the light source array, wherein the collimation element is configured to optically converge the divergent light emitted by the light sources of the light source array. This is advantageous in that simple, commercially available components can be used as light sources of the light source array, for example light-emitting diodes, or displays with LED technology or a comparable light-emitting technology. In particular, it is also possible to use light sources which, within the meaning of a Lambertian emitter, have a relatively broad light emission angle, which is actually disadvantageous for the functionality of such an optical detection device. By arranging a collimation element on the side assigned to the light source array, it is possible, however, to converge the divergent light of the light sources and convert the latter into a parallel beam path, for example, which is guided to the examination region either directly or via one or more further optical elements.

The light emission device can also be embodied as a vertical-external-cavity surface-emitting laser (VECSEL) array or as a vertical-cavity surface-emitting laser (VCSEL). The light sources can also be embodied as laser diodes.

According to an advantageous embodiment of the invention, provision is made for the optical reduction system to comprise at least one optical arrangement, e.g., a lens, an arrangement of lenses or an objective, disposed downstream of the collimation element in the beam path of the light emitted by the light source array, said optical device being provided for imaging the light received by the collimation element with a reduced imaging scale. This facilitates a particularly high resolution examination of an object in the examination region. In the examination region, a reduced image representation of a light pattern emitted by the light source array is projected into the examination region as a result of the optical device. Here, the optical device is focused, at least in relation to the examination region, on a specific examination plane of the examination region, on which the object to be examined should be placed. By way of example, the optical device can be a microscope objective or any other type of lens or lens arrangement.

Here, the overall reduction scale can be set dependent on the numerical aperture of the collimation element and/or of the optical device.

According to an advantageous embodiment of the invention, provision is made for the optical detection device to comprise an optical magnification system in the beam path of the light between the examination region and the light detection side of the light detection device, said optical magnification system converting the light pattern received from the examination region into a magnified light pattern arriving at the light detection side. In this way, the image representation of the light pattern emitted by the light source array, which is reduced in the examination region, can be magnified back to a scale that is matched to the characteristics of the light detection device, for example to the dimensions and/or resolution of the latter. By way of example, the optical magnification system can comprise a magnification objective or any other magnifying lens arrangement. The optical magnification system is focused in the direction of the examination region on the examination plane.

Such an optical magnification system is not required in all cases and consequently optional. By way of example, if a global detection element, e.g., a single photodiode, is used as a light detection device then the optical magnification system can be readily dispensed with.

According to an advantageous embodiment of the invention, provision is made for the light detection device to comprise one or more light-sensitive elements, wherein the number of light-sensitive elements is less than the number of light sources of the light source array. This allows the use of simple and cost-effective light detection devices, which facilitate a particularly high resolution of the detection device as an end result even without a particularly high resolution on account of the substantially higher resolution of the light source array. This is possible as a result of being able to generate variable light patterns by way of the light source array, said variable light patterns leading to different illuminations of the object arranged in the examination region. Using the light patterns received at the light detection device, it is possible by calculation to reconstruct the object arranged in the examination region at a substantially higher resolution, which lies significantly above the resolution of the light detection device. By way of example, the light detection device can be embodied as a camera, for example as a CCD or CMOS camera chip. The light detection device can also comprise photodiodes or similar elements.

According to an advantageous embodiment of the invention, provision is made for the diameter of each light source of the light source array to be less than 500 nanometers. Using such nano light sources, it is possible to generate light patterns with a particularly high resolution and project said light patterns onto the examination region via the optical reduction system.

According to an advantageous embodiment of the invention, provision is made for the light sources of the light source array to be light-emitting diodes (LEDs), lasers (e.g., vertical-external-cavity surface-emitting lasers (VECSELs) or vertical-cavity surface-emitting lasers (VCSELs)) or other structured light sources. In principle, the light-emitting diodes can be any type of light-emitting diodes. Gallium nitride-based light-emitting diodes are particularly advantageous.

According to an advantageous embodiment of the invention, provision is made for the light detection device to be coupled to the light emission device by way of a control device configured to control the multiplicity of light sources according to a defined activation scheme and configured for integrated, synchronized processing of the data received by the light detection device. This facilitates computational processing of the data received by the light detection device, i.e., the light patterns received from the examination region. As a result of the coupling between the light detection device and the light emission device, the control device, having available the information about the emitted light patterns, can determine an image representation of an object arranged in the examination region with a substantially higher resolution than actually permitted by the diffraction limit on account of different received light patterns.

The object set forth at the outset is moreover achieved by a method for operating an optical detection device of the aforementioned type, said method including the following features:

a) activating some of the light sources of the light emission device, separately or in groups, according to a defined activation scheme for the emission of light, such as sequentially or in accordance with defined patterns, b) receiving emitted light directly from the activated light sources, or light resulting therefrom, by way of the light detection device, c) capturing the electrical signals generated by the light detection device in response to the light reaching the light detection side of the light detection device and/or storing the electrical signals or data representative therefor with reference to the defined activation scheme of the light sources, d) generating an at least two-dimensional image representation of an object to be examined, said object being positioned in the examination region of the optical detection device, from the captured and/or stored signals and/or data.

This also allows the aforementioned advantages to be realized.

According to an advantageous embodiment of the invention, provision is made for the fluorescence capabilities of an object positioned in the examination region to be captured and assessed. This also allows fluorescent molecules to be examined by microscopy using the optical detection device according to the invention.

DESCRIPTION OF THE DRAWINGS

The invention will be explained in detail below on the basis of exemplary embodiments using drawings. In detail.

DETAILED DESCRIPTION

Figure 1:
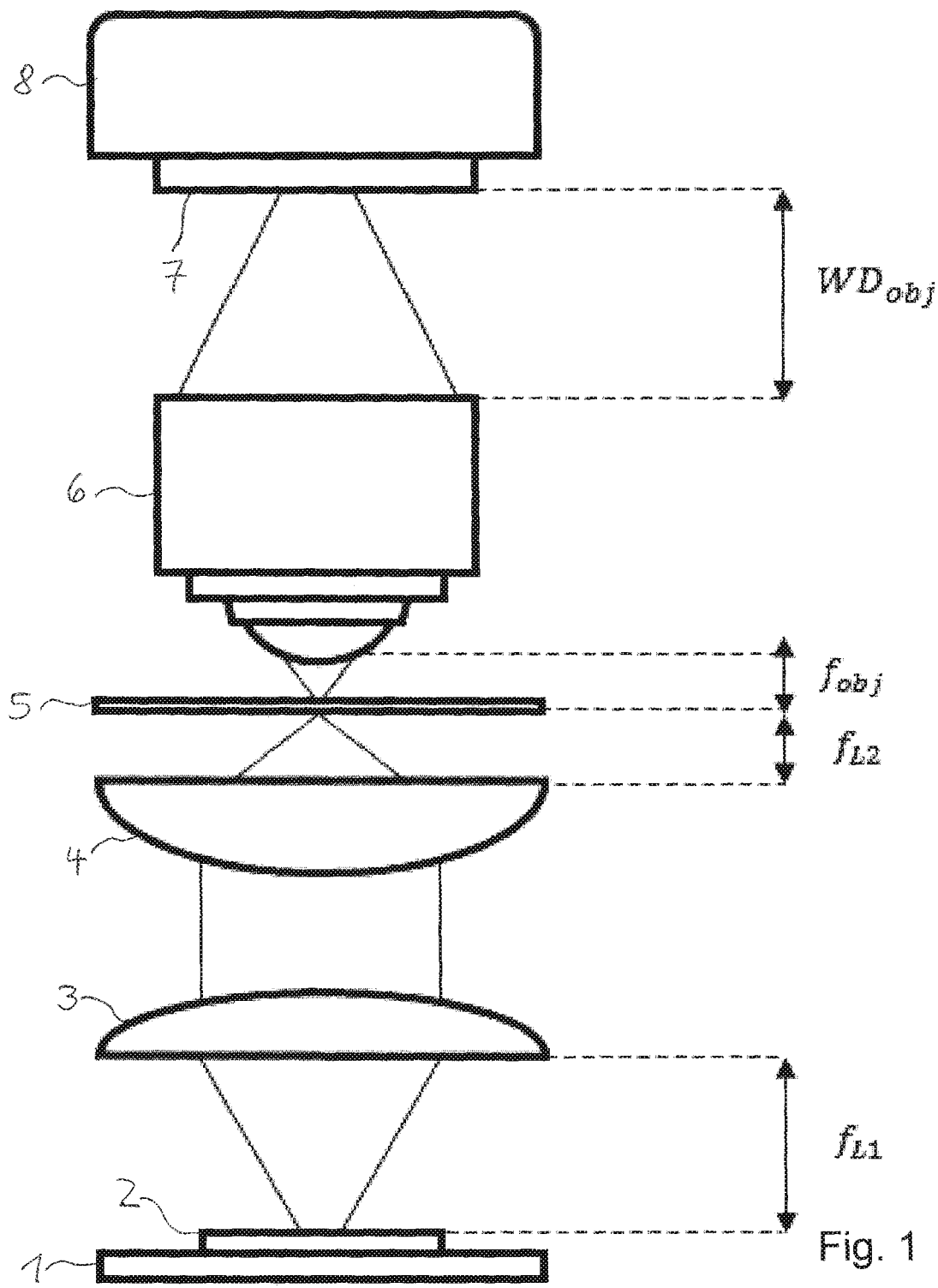
FIG. 1 shows an exemplary structure of an optical detection device in a side view and FIG. 2 shows a further embodiment of an optical detection device in a side view.

The optical detection device as per FIG. 1 comprises a light emission device 1, which has a light source array 2. The light source array 2 comprises a multiplicity of separately electrically actuatable electric light sources, which are arranged in a manner distributed over the light source array 2 in a matrix structure or in a two-dimensional arrangement defined in any other way. The light sources of the light source array 2 emit light at a light emission side, said light impinging on a collimation element 3. The collimation element 3 converts the divergent light emitted by the light source array 2 into a parallel beam path. The light emitted by the collimation element 3 impinges on a lens 4, which brings the received light onto a smaller imaging scale and projects said light onto an examination plane of an examination region 5.

An object that is intended to be examined by means of the optical detection device can be arranged in the examination region 5, in particular in the examination plane.

The collimation element 3 and the lens 4 are parts of an optical reduction system, which is configured to optically reduce a light pattern emitted by the light sources of the light source array 2. Accordingly, the examination region 5 is irradiated by a light pattern that has been reduced in relation to the light pattern emitted by the light source array 2.

Along the beam path, the light from the examination region 5 reaches an optical magnification system 6, which may be embodied as a magnification objective, for example. The optical magnification system 6 converts the light pattern received from the examination region 5 into a magnified light pattern, which is projected onto a light detection side 7 of a light detection device 8. The light detection device 8 can comprise one or more light sensor elements, for example a matrix of light sensor elements.

By way of example, if a matrix with a very high number of very small light sources, as in the case of a smartphone display, for example, is used for the light source array 2, the region in the examination region 5 irradiated by the light can be altered accordingly by way of activating different light sources of the light source array 2 in succession. In this way, an object arranged in the examination region 5 can be scanned at a very high resolution, for example with an increment in the region of less than 100 nm, by way of successively activating different light sources. The light patterns arising from this can be received on the receiver side, i.e., by the light detection device 8. An image representation of the object arranged in the examination region 5 can be generated with an extremely high resolution by way of a control device, which is fed both information about the data received by the light detection device 8 and actuation data of the light sources of the light source array 2.

Figure 2:
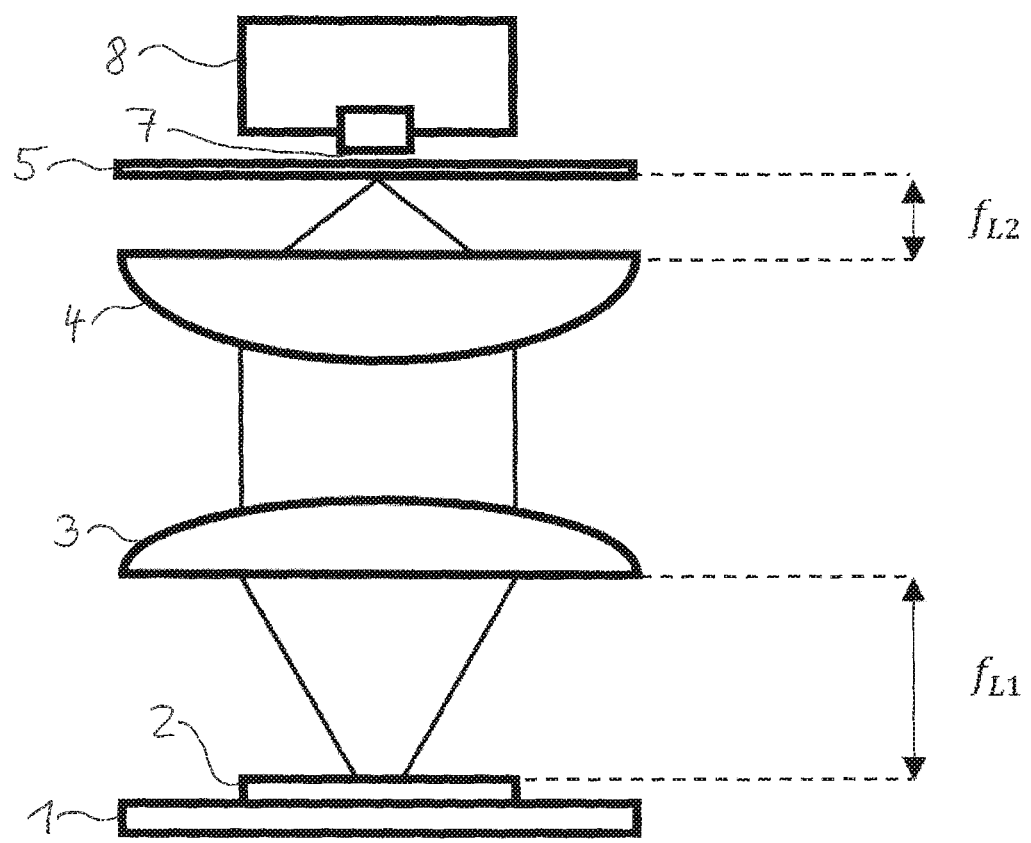

In the embodiment of FIG. 1, the light detection device 8 can be, e.g., a camera sensor, for example a CCD sensor with a multiplicity of pixels. FIG. 2 shows an embodiment of the optical device, in which a single photodiode is used as a light detection device 8. This is advantageous in that the entire structure of the optical detection device can be substantially simplified and, in particular, can be designed with a shorter length since the optical magnification system 6 can be dispensed with in this case. Consequently, the light is transmitted from the light source array 2 directly to the light detection device 8 via the collimation element 3, the lens 4 and the examination region 5.

The invention claimed is:

1. An optical detection device, comprising:
    a light emission device having a light source array which comprises a multiplicity of separately electrically actuatable electric light sources which are distributed over a light emission side of the light source array in a matrix structure or in a two-dimensional geometric arrangement and are configured to emit a light pattern in a direction along a beam path that extends from the light emission side,
    a light detection device having a light detection side in the beam path, facing toward, spaced a distance from, and optically coupled to the light emission side of the light source array,
    an examination region in which an object to be examined is arrangeable, positioned along the beam path, between the light detection of the light detection device and the light emission side of the light source array,
    an optical reduction system arranged in the beam path that extends from the light emission side of the light source array and the examination region, configured to optically demagnify the light pattern emitted by the light sources of the light source array into a demagnified light pattern in relation to the light pattern emitted by the light source array and to radiate the demagnified light pattern, in said direction, along the beam path through the examination region, and
    an optical magnification system positioned, along the beam path, between the examination region and the light detection side of the light detection device, and configured to receive the demagnified light pattern radiated through the examination region, convert the received light pattern into a magnified light pattern, and project the magnified light pattern in said direction along the beam path onto the light detection side.

2. The optical detection device as claimed in claim 1, wherein:
    the separately electrically actuatable electric light sources are divergent light sources, and
    the optical reduction system comprises a side facing toward the light source array and an opposite side facing toward the examination region, and further comprises at least one collimation element, which is arranged on the side of the optical reduction system facing toward the light source array, wherein the collimation element is configured to optically convert the divergent light emitted by the light sources of the light source array to a parallel beam path.

3. The optical detection device as claimed in claim 2, wherein the optical reduction system comprises at least one optical arrangement disposed downstream of the collimation element, between the collimation element and the examination region, in the beam path of the light emitted by the light source array, said at least one optical arrangement configured to optically converge the light pattern from the collimation element to the demagnified light pattern, according to a reduced imaging scale, wherein downstream is in said direction.

4. The optical detection device as claimed in claim 3 wherein the at least one optical arrangement is selected from the group consisting of a lens, an arrangement of lenses, and an objective.

5. The optical detection device as claimed in claim 1, wherein the light detection device comprises one or more light-sensitive elements, wherein a total number of light-sensitive elements is less than a total number of light sources of the light source array.

6. The optical detection device as claimed in claim 1, wherein a diameter of each light source of the light source array is less than 500 nanometers.

7. The optical detection device as claimed in claim 1 wherein the light sources of the light source array are light-emitting diodes (LEDs).

8. The optical detection device as claimed claim 1, wherein the light detection device is electronically coupled to the light emission device by way of a control device configured to control the light sources according to a defined activation scheme and configured to perform integrated, synchronized processing of data received by the light detection device.

9. The optical detection device as claimed in claim 1, wherein the optical detection device is a high resolution microscope.

10. A method for operating an optical detection device as claimed in claim 1, comprising:

activating some of the light sources of the light emission device, separately or in groups, according to a defined activation scheme for emission of light, receiving emitted light directly from activated light sources activated in said activating step, or light resulting therefrom, by way of the light detection device, capturing electrical signals generated by the light detection device in response to the light reaching the light detection side of the light detection device and/or storing the electrical signals or data representative therefor with reference to a defined activation scheme of the light sources, and generating an at least a two-dimensional image representation of an object to be examined, said object being positioned in the examination region of the optical detection device, from the captured and/or stored signals and/or data.

11. The method as claimed in claim 10, further comprising capturing and assessing fluorescence of an object positioned in the examination region.

12. The method of claim 10 wherein the activating step is performed sequentially or in accordance with defined patterns.

13. The optical detection device as claimed in claim 1, wherein arranged in a beam path from the light arrangement of the examination region further includes being arranged in a straight-lined beam path from the light emission side of the light source array to the light detection side of the light detection device.

14. The method of claim 10 wherein the activation scheme is sequential.

15. The method of claim 10 wherein the activation scheme is according to one or more defined patterns.

* * * * *

UNITED STATES PATENT AND TRADEMARK OFFICE
CERTIFICATE OF CORRECTION

| | | |
|---|---|---|
| PATENT NO. | : 11,789,250 B2 | Page 1 of 1 |
| APPLICATION NO. | : 17/087754 | |
| DATED | : October 17, 2023 | |
| INVENTOR(S) | : Waag et al. | |

It is certified that error appears in the above-identified patent and that said Letters Patent is hereby corrected as shown below:

On the Title Page

Please change the Foreign Priority designation from GB to DE

Signed and Sealed this
Seventeenth Day of September, 2024

Katherine Kelly Vidal
*Director of the United States Patent and Trademark Office*